US008658291B2

(12) United States Patent
Kirby et al.

(10) Patent No.: US 8,658,291 B2
(45) Date of Patent: Feb. 25, 2014

(54) CMAS MITIGATION COMPOSITIONS, ENVIRONMENTAL BARRIER COATINGS COMPRISING THE SAME, AND CERAMIC COMPONENTS COMPRISING THE SAME

(75) Inventors: Glen Harold Kirby, Liberty Township, OH (US); Brett Allen Boutwell, West Chester, OH (US); Ming Fu, Hamilton, OH (US); Bangalore Aswatha Nagaraj, West Chester, OH (US); Brian Thomas Hazel, West Chester, OH (US)

(73) Assignee: General Electric Company, Schenectady, NY (US)

( * ) Notice: Subject to any disclaimer, the term of this patent is extended or adjusted under 35 U.S.C. 154(b) by 369 days.

(21) Appl. No.: 12/339,974

(22) Filed: Dec. 19, 2008

(65) Prior Publication Data

US 2010/0158680 A1  Jun. 24, 2010

(51) Int. Cl.
B32B 9/00 (2006.01)
B32B 19/00 (2006.01)
B32B 9/04 (2006.01)
B32B 13/04 (2006.01)
F03B 3/12 (2006.01)
F03B 7/00 (2006.01)
F03D 11/02 (2006.01)

(52) U.S. Cl.
USPC ........... 428/702; 428/446; 428/697; 428/701; 416/241 B; 416/241 R

(58) Field of Classification Search
USPC .............. 428/702, 446, 697, 701; 416/241 B, 416/241 R
See application file for complete search history.

(56) References Cited

U.S. PATENT DOCUMENTS

| 4,255,495 | A | * | 3/1981 | Levine et al. ................. 428/632 |
| 4,269,903 | A | | 5/1981 | Clingman |
| 6,159,553 | A | | 12/2000 | Li |
| 6,261,643 | B1 | * | 7/2001 | Hasz et al. ................. 427/419.3 |
| 6,296,941 | B1 | | 10/2001 | Eaton |
| 6,312,763 | B1 | | 11/2001 | Eaton |
| 6,444,335 | B1 | * | 9/2002 | Wang et al. ................... 428/701 |
| 6,617,037 | B2 | | 9/2003 | Sun |
| 6,759,151 | B1 | | 7/2004 | Lee |
| 6,916,429 | B2 | * | 7/2005 | Kool et al. .................... 216/104 |
| 7,001,679 | B2 | | 2/2006 | Campbell |

(Continued)

FOREIGN PATENT DOCUMENTS

| JP | 56102580 A | 8/1981 |
| JP | 2001207865 A | 8/2001 |
| JP | 2006347871 A | 12/2006 |
| JP | 2007015913 A | 1/2007 |

OTHER PUBLICATIONS

Office Action from corresponding JP Application No. 2009-236756, dated Jun. 4, 2013.

*Primary Examiner* — Jonathan Langman
(74) *Attorney, Agent, or Firm* — William Scott Andes; Gary M. Hartman; Domenica N. S. Hartman

(57) ABSTRACT

Calcium magnesium aluminosilicate (CMAS) mitigation compositions selected from rare earth elements, rare earth oxides, zirconia, hafnia partially or fully stabilized with alkaline earth or rare earth elements, zirconia partially or fully stabilized with alkaline earth or rare earth elements, magnesium oxide, cordierite, aluminum phosphate, magnesium silicate, and combinations thereof when the CMAS mitigation composition is included as a separate CMAS mitigation layer in an environmental barrier coating for a high temperature substrate component.

15 Claims, 3 Drawing Sheets

(56) References Cited

U.S. PATENT DOCUMENTS

| | | |
|---|---|---|
| 7,354,651 B2 | 4/2008 | Hazel |
| 7,357,994 B2 | 4/2008 | Hazel |
| 7,374,818 B2 | 5/2008 | Bhatia |
| 8,455,103 B2 * | 6/2013 | Louchet-Pouillerie et al. ............ 428/446 |
| 2002/0098776 A1 * | 7/2002 | Dopper ............ 451/2 |
| 2003/0118440 A1 * | 6/2003 | Zhao et al. ............ 415/118 |
| 2005/0074625 A1 | 4/2005 | Meschter |
| 2005/0164027 A1 * | 7/2005 | Lau et al. ............ 428/632 |
| 2006/0211241 A1 * | 9/2006 | Govern et al. ............ 438/653 |
| 2006/0280954 A1 | 12/2006 | Spitsberg |
| 2006/0280955 A1 | 12/2006 | Spitsberg |
| 2006/0280962 A1 * | 12/2006 | Hazel et al. ............ 428/689 |
| 2007/0134518 A1 * | 6/2007 | Feist et al. ............ 428/701 |
| 2007/0292616 A1 * | 12/2007 | Hazel ............ 427/337 |
| 2007/0292624 A1 * | 12/2007 | Nagaraj et al. ............ 427/419.3 |
| 2007/0298277 A1 * | 12/2007 | Darolia et al. ............ 428/632 |
| 2008/0044662 A1 | 2/2008 | Schlichting |
| 2008/0044686 A1 | 2/2008 | Schlichting |
| 2008/0057326 A1 | 3/2008 | Schlichting |
| 2008/0113217 A1 | 5/2008 | Maloney |
| 2008/0113218 A1 | 5/2008 | Schlichting |
| 2009/0004427 A1 | 1/2009 | Sarrafi-Nour |

* cited by examiner

CMAS MITIGATION COMPOSITIONS, ENVIRONMENTAL BARRIER COATINGS COMPRISING THE SAME, AND CERAMIC COMPONENTS COMPRISING THE SAME

STATEMENT OF GOVERNMENT RIGHTS

This invention was made, at least in part, with a grant from the Government of the United States (Contract No. N00019-04-C-0093, from the Department of the Navy). The Government may have certain rights to the invention.

TECHNICAL FIELD

Embodiments described herein generally relate to calcium magnesium aluminosilicate (CMAS) mitigation compositions, environmental barrier coatings comprising the same, and ceramic components comprising the same.

BACKGROUND OF THE INVENTION

Higher operating temperatures for gas turbine engines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. While superalloys have found wide use for components used throughout gas turbine engines, and especially in the higher temperature sections, alternative lighter-weight substrate materials have been proposed.

CMC and monolithic ceramic components can be coated with environmental barrier coatings (EBCs) to protect them from the harsh environment of high temperature engine sections. EBCs can provide a dense, hermetic seal against the corrosive gases in the hot combustion environment. In dry, high temperature environments, silicon-based (nonoxide) CMCs and monolithic ceramics undergo oxidation to form a protective silicon oxide scale. However, the silicon oxide reacts rapidly with high temperature steam, such as found in gas turbine engines, to form volatile silicon species. This oxidation/volatilization process can result in significant material loss, or recession, over the lifetime of an engine component. This recession also occurs in CMC and monolithic ceramic components comprising aluminum oxide, as aluminum oxide reacts with high temperature steam to form volatile aluminum species as well.

Currently, most EBCs used for CMC and monolithic ceramic components consist of a three-layer coating system generally including a bond coat layer, at least one transition layer applied to the bond coat layer, and an optional outer layer applied to the transition layer. Optionally, a silica layer may be present between the bond coat layer and the adjacent transition layer. Together these layers can provide environmental protection for the CMC or monolithic ceramic component.

More specifically, the bond coat layer may comprise silicon and may generally have a thickness of from about 0.5 mils to about 6 mils. For silicon-based nonoxide CMCs and monolithic ceramics, the bond coat layer serves as an oxidation barrier to prevent oxidation of the substrate. The silica layer may be applied to the bond coat layer, or alternately, may be formed naturally or intentionally on the bond coat layer. The transition layer may typically comprise mullite, barium strontium aluminosilicate (BSAS), and various combinations thereof, while the optional outer layer may comprise BSAS. There may be from 1 to 3 transition layers present, each layer having a thickness of from about 0.1 mils to about 6 mils, and the optional outer layer may have a thickness of from about 0.1 mils to about 40 mils.

Each of the transition and outer layers can have differing porosity. At a porosity of about 10% or less, the layer is a hermetic seal to the hot gases in the combustion environment. From about 10% to about 40% porosity, the layer can display mechanical integrity, but hot gases can penetrate through the coating layer damaging the underlying EBC. While it is necessary for at least one of the transition layer or outer layer to be hermetic, it can be beneficial to have some layers of higher porosity range to mitigate mechanical stress induced by any thermal expansion mismatch between the coating materials and the substrate.

Unfortunately, deposits of CMAS have been observed to form on components located within higher temperature sections of gas turbine engines, particularly in combustor and turbine sections. These CMAS deposits have been shown to have a detrimental effect on the life of thermal barrier coatings, and it is known that BSAS and CMAS chemically interact at high temperatures, i.e. above the melting point of CMAS (approximately 1150° C. to 1650° C.). It is also known that the reaction byproducts formed by the interaction of BSAS and CMAS can be detrimental to EBCs, as well as susceptible to volatilization in the presence of steam at high temperatures. Such volatilization can result in the loss of coating material and protection for the underlying component. Thus, it is expected that the presence of CMAS will interact with the EBC, thereby jeopardizing the performance of the component along with component life.

Accordingly, there remains a need for CMAS mitigation compositions, as well as EBCs and ceramic substrates comprising the same.

BRIEF DESCRIPTION OF THE INVENTION

Embodiments herein generally relate to calcium magnesium aluminosilicate (CMAS) mitigation compositions selected from the group consisting of rare earth elements, rare earth oxides, zirconia, hafnia partially or fully stabilized with alkaline earth or rare earth elements, zirconia partially or fully stabilized with alkaline earth or rare earth elements, magnesium oxide, cordierite, aluminum phosphate, magnesium silicate, and combinations thereof wherein the CMAS mitigation composition is included as a separate CMAS mitigation layer in an environmental barrier coating for a high temperature substrate component.

Embodiments herein also generally relate to CMAS mitigation compositions selected from the group consisting of rare earth elements, rare earth oxides, rare earth hafnates, rare earth zirconates, zirconia, hafnia partially or fully stabilized with alkaline earth or rare earth elements, zirconia partially or fully stabilized with alkaline earth or rare earth elements, magnesium oxide, cordierite, magnesium aluminate spinel, rare earth monosilicates, rare earth disilicates, aluminum phosphate, magnesium silicate, alumina, and combinations thereof wherein the CMAS mitigation composition is included as an integrated CMAS mitigation layer in an environmental barrier coating for a high temperature substrate component.

Embodiments herein also generally relate to environmental barrier coatings (EBC) having CMAS mitigation capability comprising a bond coat layer; an optional silica layer; at least one transition layer; an optional outer layer; and a separate CMAS mitigation layer comprising a CMAS mitigation composition selected from the group consisting of rare earth elements, rare earth oxides, zirconia, hafnia partially or fully stabilized with alkaline earth or rare earth elements, zirconia partially or fully stabilized with alkaline earth or rare earth elements, magnesium oxide, cordierite, aluminum phosphate, magnesium silicate, and combinations thereof.

Embodiments herein also generally relate to EBCs having CMAS mitigation capability comprising a bond coat layer; an optional silica layer; at least one transition layer; an optional outer layer; and an integrated CMAS mitigation layer comprising BSAS; and a CMAS mitigation composition selected from the group consisting of rare earth elements, rare earth oxides, rare earth hafnates, rare earth zirconates, zirconia, hafnia partially or fully stabilized with alkaline earth or rare earth elements, zirconia partially or fully stabilized with alkaline earth or rare earth elements, magnesium oxide, cordierite, magnesium aluminate spinel, rare earth monosilicates, rare earth disilicates, aluminum phosphate, magnesium silicate, alumina, and combinations thereof.

Embodiments herein also generally relate to high temperature components having CMAS mitigation capability comprising an environmental barrier coating including a bond coat layer; an optional silica layer; at least one transition layer; an optional outer layer; and a separate CMAS mitigation layer comprising a CMAS mitigation composition selected from the group consisting of rare earth elements, rare earth oxides, zirconia, hafnia partially or fully stabilized with alkaline earth or rare earth elements, zirconia partially or fully stabilized with alkaline earth or rare earth elements, magnesium oxide, cordierite, aluminum phosphate, magnesium silicate, and combinations thereof.

Embodiments herein also generally relate to high temperature components having CMAS mitigation capability comprising an environmental barrier coating including a bond coat layer; an optional silica layer; at least one transition layer; an optional outer layer; and an integrated CMAS mitigation layer comprising BSAS; and a CMAS mitigation composition selected from the group consisting of rare earth elements, rare earth oxides, rare earth hafnates, rare earth zirconates, zirconia, hafnia partially or fully stabilized with alkaline earth or rare earth elements, zirconia partially or fully stabilized with alkaline earth or rare earth elements, magnesium oxide, cordierite, magnesium aluminate spinel, rare earth monosilicates, rare earth disilicates, aluminum phosphate, magnesium silicate, alumina, and combinations thereof.

These and other features, aspects and advantages will become evident to those skilled in the art from the following disclosure.

BRIEF DESCRIPTION OF THE DRAWINGS

While the specification concludes with claims particularly pointing out and distinctly claiming the invention, it is believed that the embodiments set forth herein will be better understood from the following description in conjunction with the accompanying figures, in which like reference numerals identify like elements.

DETAILED DESCRIPTION OF THE INVENTION

Embodiments described herein generally relate to CMAS mitigation compositions, as well as EBCs and ceramic components comprising the same.

The CMAS mitigation compositions described herein may be suitable for use in conjunction with EBCs for substrates comprising CMCs, and monolithic ceramics. As used herein, "CMCs" refers to silicon-containing, or oxide-oxide, matrix and reinforcing materials. Some examples of CMCs acceptable for use herein can include, but should not be limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. These oxide-oxide composites are described below.

Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

As used herein, "monolithic ceramics" refers to materials comprising only silicon carbide, only silicon nitride, only alumina, only silica, or only mullite. Herein, CMCs and monolithic ceramics are collectively referred to as "ceramics."

As used herein, the term "barrier coating(s)" refers to environmental barrier coatings (EBCs). The barrier coatings herein may be suitable for use on ceramic substrate components 10 found in high temperature environments, such as those present in gas turbine engines, for example, combustor components, turbine blades, shrouds, nozzles, heat shields, and vanes. "Substrate component" or simply "component" refers to a component made from "ceramics," as defined herein.

Figure 1:
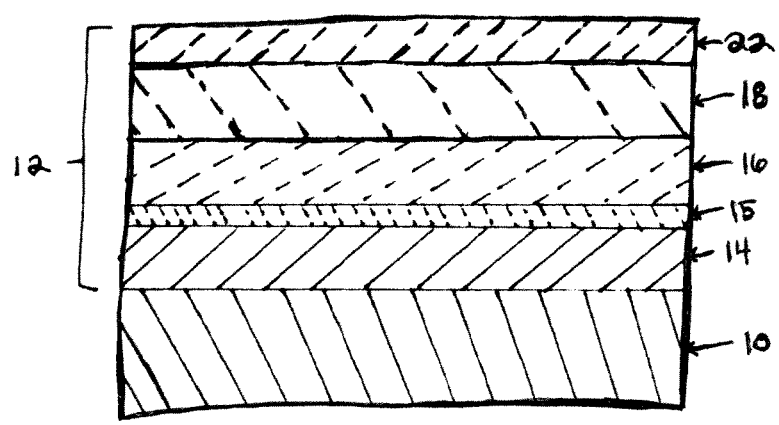
FIG. 1 is a schematic cross sectional view of one embodiment of an environmental barrier coating in accordance with the description herein.

More specifically, EBC 12 may generally comprise any existing environmental barrier coating system that generally comprises a silicon bond coat layer 14, an optional silica layer 15 adjacent to bond coat layer 14, at least one transition layer 16 adjacent to bond coat layer 14 (or silica layer 15 if present), an optional outer layer 18 adjacent to transition layer 16, and an optional abradable layer 22 adjacent to transition layer 16 (or outer layer 18 if present), as shown generally in FIG. 1. As defined previously herein, "transition layer" 16 refers to any of mullite, BSAS, and various combinations thereof, while "outer layer" 18 refers to BSAS.

Unlike existing EBCs, and in addition to the layers described previously, the present embodiments may also include CMAS mitigation compositions to help prevent the EBC from degradation due to reaction with CMAS in high temperature engine environments. Such CMAS mitigation compositions may be present as a separate CMAS mitigation layer on top of the existing EBC systems, as a grain boundary phase in the BSAS outer layer, or as discrete dispersed refractory particles in the BSAS outer layer, as defined herein below.

Figure 2:
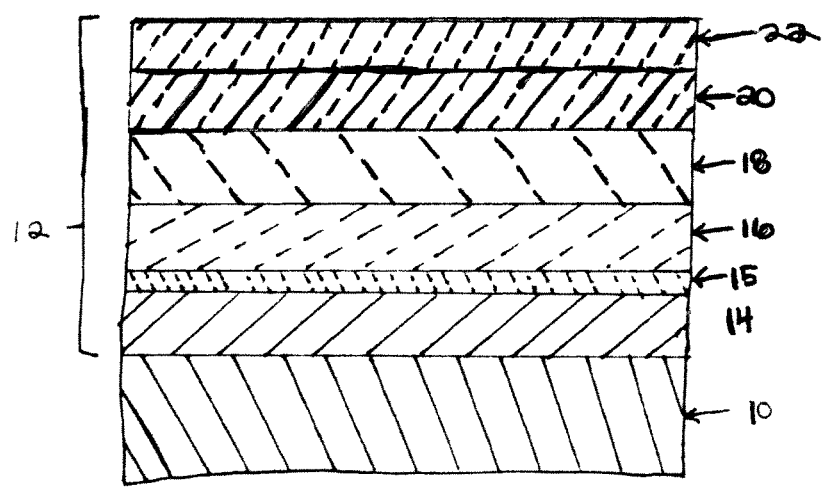
FIG. 2 is a schematic cross sectional view of one embodiment of an environmental barrier coating having a separate CMAS mitigation layer in accordance with the description herein.

As shown in FIG. 2, when CMAS mitigation is included in the EBC as a separate mitigation layer on top of existing systems, "separate CMAS mitigation layer" 20 may comprise at least one CMAS mitigation composition. As used herein throughout, "CMAS mitigation composition(s)" refers to compositions selected from rare earth elements (Ln), rare earth oxides, zirconia, hafnia partially or fully stabilized with alkaline earth or rare earth elements, zirconia partially or fully stabilized with alkaline earth or rare earth elements, magnesium oxide, cordierite, aluminum phosphate, magnesium silicate, and combinations thereof. When included as an integrated CMAS mitigation layer, as explained below, the "CMAS mitigation compositions" may also comprise alumina, rare earth hafnates, rare earth zirconates, rare earth monosilicates, and rare earth disilicates.

As used herein throughout, "Ln" refers to the rare earth elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and mixtures thereof. Furthermore, as used herein, "rare earth oxides" can refer to $Sc_2O_3$, $Y_2O_3$, $CeO_2$, $La_2O_3$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$ or mixture thereof.

By way of example and not limitation, when including a separate CMAS mitigation layer 20, the EBC may comprise one of the following architectures: a silicon bond coat layer 14, an optional silica layer 15, a mullite transition layer 16, a BSAS outer layer 18, a separate CMAS mitigation layer 20, and optionally, an abradable layer 22; a silicon bond coat layer 14, an optional silica layer 15, a mullite-BSAS transition layer 16, a BSAS outer layer 18, a separate CMAS mitigation layer 20, and optionally, an abradable layer 22.

In the previous examples, optional abradable layer 22 may comprise the same material present in separate CMAS mitigation layer 20, a rare earth disilicate ($Ln_2Si_2O_7$), or BSAS. The abradable may be a highly porous layer comprising up to about 50% porosity, or it may consist of patterned ridges that are dense (less than about 10% porosity) or porous (up to about 50% porosity). Abradable layer 22 can abrade upon impact from an adjacent, rotating engine component. The energy absorbed into the abradable coating can help prevent damage from incurring to the adjacent, rotating engine component. For example, in one embodiment, the EBC plus abradable layer could be present on a CMC shroud. Adjacent rotating blades having a tight clearance with the shroud could result in an impact event. The presence of abradable layer 22 can help prevent damage to the rotating blades.

Figure 3:
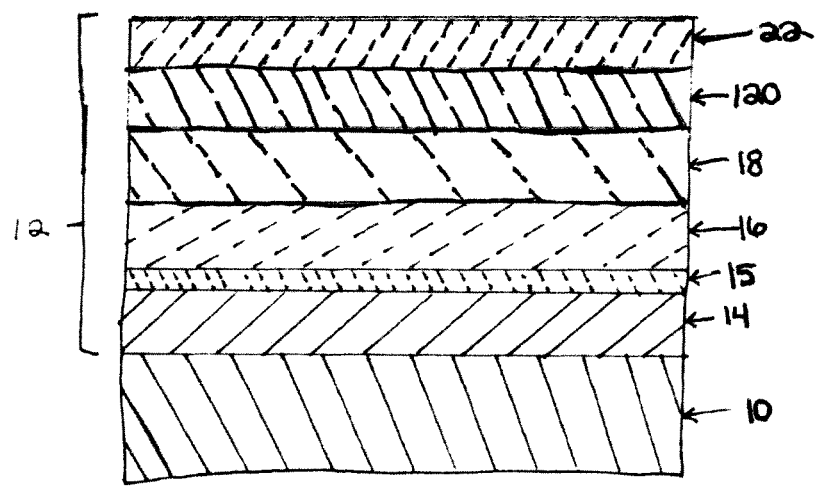
FIG. 3 is a schematic cross sectional view of one embodiment of an environmental barrier coating having an integrated CMAS mitigation layer in accordance with the description herein.

As shown in FIG. 3, and as previously described, CMAS mitigation may alternately be included as an integrated CMAS mitigation layer 120. In this instance, "integrated CMAS mitigation layer" 120 refers to a layer comprising CMAS mitigation compositions in combination with BSAS. More particularly, the CMAS mitigation composition can be included as either discrete dispersed refractory particles in BSAS, or as a grain boundary phase in BSAS.

When included as an integrated CMAS mitigation layer, the "integrated CMAS mitigation layer" may comprise BSAS with the addition of any of the CMAS mitigation compositions previously defined herein, as well as alumina, rare earth hafnates ($Ln_2Hf_2O_7$), rare earth zirconates ($Ln_2Zr_2O_7$), rare earth monosilicates, and rare earth disilicates.

By way of example and not limitation, EBCs having an integrated CMAS mitigation layer 120 as either as a grain boundary phase or as discrete dispersed refractory particles, may comprise one of the following architectures: a silicon bond coat layer 14, an optional silica layer 15, a mullite-BSAS transition layer 16, and an integrated CMAS mitigation layer 120; a silicon bond coat layer 14, an optional silica layer 15, a mullite transition layer 16, and an integrated CMAS mitigation layer 120.

Regardless of the particular architecture of the EBC with CMAS mitigation capability, the substrate component can be coated using conventional methods known to those skilled in the art to produce all desired layers and selectively place the CMAS mitigation compositions as either a separate layer, as grain boundary phase in BSAS, or as discrete, dispersed refractory particles in BSAS. Such conventional methods can generally include, but should not be limited to, plasma spraying, high velocity plasma spraying, low pressure plasma spraying, solution plasma spraying, suspension plasma spraying, chemical vapor deposition (CVD), electron beam physical vapor deposition (EBPVD), sol-gel, sputtering, slurry processes such as dipping, spraying, tape-casting, rolling, and painting, and combinations of these methods. Once coated, the substrate component may be dried and sintered using either conventional methods, or unconventional methods such as microwave sintering, laser sintering or infrared sintering. Unless an abradable layer is present, the CMAS mitigation layer, whether separate or integrated, can be the outermost layer of the EBC.

More specifically, the CMAS mitigation grain boundary phase can be produced in a variety of ways, including particle coating and slurry methods. In one example, the CMAS grain boundary phase can be achieved by coating particles of BSAS with the desired CMAS mitigation composition(s) before the BSAS is deposited on the ceramic substrate using a conventional method known to those skilled in the art. Coating the BSAS particles can be accomplished by chemical vapor deposition on particles in a fluidized bed reactor or by a solution (sol-gel) type process where precursors of the CMAS mitigation composition are deposited onto the BSAS particles from a liquid phase, followed by heat treatment of the BSAS particles to form the desired CMAS mitigation composition on the surface of the BSAS particles. Once the BSAS particles with the CMAS mitigation composition are obtained, the substrate component can be coated, dried, and sintered using any of the previously described methods known to those skilled in the art. Ultimately, the surface layer of the CMAS mitigation composition on the BSAS particles becomes the grain boundary phase in the coating. In these instances, to form the grain boundary phase, the refractory particles can have an average size of less than about 100 nm. If the refractory particles are larger than about 100 nm, the particles will be too large to properly coat the EBC particles as needed to form the grain boundary phase, and will instead be present as dispersed refractory particles as explained below.

In another example using slurry methods, BSAS particles (without a CMAS mitigation composition coating) can be used. In such instances, the grain boundary phases can be achieved by using sol-gel precursors in the slurry, by infiltration of sol-gel precursors into the dry coatings, or by infiltration of sol-gel precursors into the sintered coatings followed by an additional sintering step.

Dispersion of the refractory particles into the BSAS layer can occur by various means depending on the process chosen to deposit the barrier coating. For a plasma spray process, BSAS particles can be mixed with the CMAS mitigation refractory particles before coating deposition. Mixing may consist of combining BSAS and the refractory particles without a liquid, or by mixing a slurry of the BSAS and refractory particles. The dry particles or slurries can then be mechanically agitated using a roller mill, planetary mill, blender, paddle mixer, ultrasonic horn, or any other method known to those skilled in the art. For the slurry process, the refractory particles dispersed in the slurry will become dispersed particles in the coating after drying and sintering of a slurry-deposited layer.

In order to maintain discrete, refractory particles in the microstructure, the average particle size of the CMAS mitigation refractory particles in the slurry can be greater than about 20 nm, and in one embodiment from about 200 nm to about 10 micrometers in size. The refractory particles can comprise from about 1% to about 60% by volume of the layer, with the remainder being BSAS or a combination of BSAS and porosity.

Regardless of whether the CMAS mitigation composition is present as a separate mitigation layer on top of the existing EBC systems, or as an integrated mitigation layer (e.g. discrete dispersed refractory particles in the BSAS, or a grain boundary phase in the BSAS), the benefits are several. Namely, the CMAS mitigation compositions can help prevent the EBC from degradation due to reaction with CMAS in high temperature engine environments. More particularly, the CMAS mitigation compositions can help prevent or slow the reaction of CMAS with the barrier coating that can form secondary phases that rapidly volatilize in steam. Additionally, CMAS mitigation compositions can help prevent or slow the penetration of CMAS through the barrier coating along the grain boundaries into a nonoxide, silicon-based substrate. Reaction of CMAS with substrates such as silicon nitrate and silicon carbide evolve nitrogen-containing and carbonaceous gases, respectively. Pressure from this gas evolution can result in blister formation within the EBC coating. These blisters can easily rupture and destroy the hermetic seal against water vapor provided by the EBC in the first instance.

The presence of CMAS mitigation compositions can help prevent or slow the attack of molten silicates on the EBC, thereby allowing the EBC to perform its function of sealing the CMC from corrosive attack in high temperature steam. Moreover, the CMAS mitigation compositions can help prevent recession of the CMC, and also any layers of the EBC that may be susceptible to steam recession if CMAS reacts with it, to form steam-volatile secondary phases. Dimensional changes of ceramic components due to steam recession can limit the life and/or functionality of the component in turbine engine applications.

With respect to integrated CMAS mitigation layers in particular, having CMAS mitigation compositions situated as grain boundaries or dispersed particles can offer some unique benefits. For instance, the use of integrated CMAS mitigation layers can allow the EBC to be made with fewer overall layers and processing steps yet still provide the same protection to the underlying substrate component. Integrated layers use less CMAS mitigation composition to achieve protection from CMAS corrosion, which can result in cost savings. Moreover, integrated layers allow for the incorporation of desired properties of the outer layer compositions (i.e. the tendency of BSAS toward forming an excellent seal at high temperatures) and the CMAS corrosion resistance in a singular layer.

Thus, CMAS mitigation, whether separate or integrated, is important to allow the barrier coating to perform its functions; thereby allowing the CMC component to function properly and for its intended time span.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An environmental barrier coating (EBC) having CMAS mitigation capability comprising:
   a bond coat layer comprising silicon;
   an optional silica layer overlying the bond coat layer;
   at least one transition layer overlying the bond coat layer or the optional silica layer comprising a composition selected from the group consisting of mullite, barium strontium aluminosilicate (BSAS), and combinations thereof;
   an optional outer layer comprising BSAS overlying the at least one transition layer;
   a separate CMAS mitigation layer overlying the transition layer and overlying, if present, the outer layer, the CMAS mitigation layer comprising a CMAS mitigation composition consisting of cordierite, at least a portion of the environmental barrier coating being susceptible to infiltration by CMAS, the BSAS in at least one of the transition and outer layers being reactive with CMAS and the CMAS mitigation composition of the CMAS mitigation layer being effective to prevent or slow a reaction between CMAS and the BSAS; and
   an abradable layer applied to the separate CMAS mitigation layer.

2. A turbine engine component selected from the group consisting of combustor components, turbine blades, shrouds, nozzles, heat shields and vanes comprising the EBC of claim 1.

3. The EBC of claim 1, wherein the CMAS mitigation layer consists of the CMAS mitigation composition.

4. An EBC having CMAS mitigation capability comprising:
   a bond coat layer comprising silicon;
   an optional silica layer overlying the bond coat layer;
   at least one transition layer overlying the bond coat layer or the optional silica layer comprising a composition selected from the group consisting of mullite, barium strontium aluminosilicate (BSAS), and combinations thereof;
   an optional outer layer comprising BSAS overlying the at least one transition layer; and
   an integrated CMAS mitigation layer overlying the transition layer and overlying, if present, the outer layer, the integrated CMAS mitigation layer consisting of:
      BSAS; and
      a CMAS mitigation composition selected from the group consisting of magnesium oxide, cordierite, and combinations thereof;
   wherein at least a portion of the environmental barrier coating is susceptible to infiltration by CMAS, the BSAS in at least one of the transition layer, outer layer, and integrated CMAS mitigation layer is reactive with CMAS and the integrated CMAS mitigation layer comprises the CMAS mitigation composition as a grain boundary phase in the BSAS or as dispersed refractory particles in the BSAS, the CMAS mitigation composition of the integrated CMAS mitigation layer being effective to prevent or slow a reaction between CMAS and the BSAS.

5. The EBC of claim 4 further comprising an abradable layer applied to the integrated CMAS mitigation layer.

6. A turbine engine component selected from the group consisting of combustor components, turbine blades, shrouds, nozzles, heat shields and vanes comprising the EBC of claim 4.

7. The EBC of claim 4, wherein the CMAS mitigation composition is present in the integrated CMAS mitigation layer as the grain boundary phase on particles of the BSAS.

8. The EBC of claim 4, wherein the CMAS mitigation composition is present in the integrated CMAS mitigation layer as the dispersed refractory particles in the BSAS.

9. A component having CMAS mitigation capability comprising:
an environmental barrier coating including:
a bond coat layer;
an optional silica layer overlying the bond coat layer;
at least one transition layer overlying the bond coat layer or the optional silica layer comprising a composition selected from the group consisting of mullite, barium strontium aluminosilicate (BSAS), and combinations thereof;
an optional outer layer comprising BSAS overlying the at least one transition layer; and
an integrated CMAS mitigation layer overlying the transition layer and overlying, if present, the outer layer, the integrated CMAS mitigation layer consisting of:
BSAS; and
a CMAS mitigation composition selected from the group consisting of magnesium oxide, cordierite, and combinations thereof;
wherein at least a portion of the environmental barrier coating is susceptible to infiltration by CMAS, the BSAS in at least one of the transition layer, outer layer, and integrated CMAS mitigation layer is reactive with CMAS and the integrated CMAS mitigation layer comprises the CMAS mitigation composition as a grain boundary phase in the BSAS or as dispersed refractory particles in the BSAS, the CMAS mitigation composition of the integrated CMAS mitigation layer being effective to prevent or slow a reaction between CMAS and the BSAS.

10. The component of claim 9 wherein the bond coat layer comprises silicon.

11. The component of claim 9 wherein the substrate component is a ceramic matrix composite or a monolithic ceramic.

12. The component of claim 11 comprising a turbine engine component selected from the group consisting of combustor components, turbine blades, shrouds, nozzles, heat shields and vanes.

13. The component of claim 12 further comprising an abradable layer applied to the integrated CMAS mitigation layer.

14. The component of claim 9, wherein the CMAS mitigation composition is present in the integrated CMAS mitigation layer as the grain boundary phase on particles of the BSAS.

15. The component of claim 9, wherein the CMAS mitigation composition is present in the integrated CMAS mitigation layer as the dispersed refractory particles in the BSAS.

* * * * *